(12) United States Patent
Shirvani et al.

(10) Patent No.: US 10,043,230 B2
(45) Date of Patent: Aug. 7, 2018

(54) APPROACH TO REDUCING VOLTAGE NOISE IN A STALLED DATA PIPELINE

(71) Applicant: NVIDIA CORPORATION, Santa Clara, CA (US)

(72) Inventors: Philip Payman Shirvani, San Jose, CA (US); Peter Sommers, Santa Clara, CA (US); Eric T. Anderson, Palo Alto, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 699 days.

(21) Appl. No.: 14/033,383

(22) Filed: Sep. 20, 2013

(65) Prior Publication Data

US 2015/0089284 A1    Mar. 26, 2015

(51) Int. Cl.
*G06T 1/20* (2006.01)
*G06F 1/30* (2006.01)

(52) U.S. Cl.
CPC . *G06T 1/20* (2013.01); *G06F 1/30* (2013.01)

(58) Field of Classification Search
CPC ....... G06F 11/2041; G06F 9/3861; G06T 1/20
USPC ............................................ 713/300; 714/10
See application file for complete search history.

(56) References Cited

U.S. PATENT DOCUMENTS

| | | | | |
|---|---|---|---|---|
| 8,219,831 B2* | 7/2012 | Chaudhry | ............... | G06F 1/206 712/208 |
| 2003/0126476 A1* | 7/2003 | Greene | ................. | G06F 1/3203 713/300 |
| 2004/0068640 A1* | 4/2004 | Jacobson | .............. | G06F 1/3203 712/220 |
| 2006/0020831 A1* | 1/2006 | Golla | ........................ | G06F 1/32 713/300 |
| 2006/0206740 A1* | 9/2006 | Hurd | ..................... | G06F 1/3203 713/322 |
| 2006/0236136 A1* | 10/2006 | Jones | .................... | G06F 1/3203 713/300 |
| 2009/0096797 A1* | 4/2009 | Du | ............................ | G06T 1/20 345/506 |
| 2009/0164812 A1* | 6/2009 | Capps, Jr. | ............. | G06F 1/3203 713/320 |
| 2009/0307516 A1* | 12/2009 | Renaudin | ......... | H03K 19/00323 713/401 |
| 2010/0287357 A1* | 11/2010 | Vishkin | ................. | G06F 9/3851 712/207 |
| 2013/0219149 A1* | 8/2013 | Ellis | ......................... | G06F 9/02 712/32 |

OTHER PUBLICATIONS

Ghassan, Exploration and evaluation of traditional TCP congestion control techniques, Mar. 2012.*

* cited by examiner

*Primary Examiner* — Nitin Patel
(74) *Attorney, Agent, or Firm* — Artegis Law Group, LLP

(57) ABSTRACT

Computer and graphics processing elements, connected generally in series, form a pipeline. Circuit elements known as di/dt throttles are inserted within the pipeline at strategic locations where the potential exists for data flow to transition from an idle state to a maximum data processing rate. The di/dt throttles gently ramp the rate of data flow from idle to a typical level. Disproportionate current draw and the consequent voltage droop are thus avoided, allowing an increased frequency of operation to be realized.

21 Claims, 5 Drawing Sheets

APPROACH TO REDUCING VOLTAGE NOISE IN A STALLED DATA PIPELINE

BACKGROUND OF THE INVENTION

Field of the Invention

Embodiments of the present invention relate generally to graphics processing and, more specifically, to an approach to reducing voltage noise in a stalled data pipeline.

Description of the Related Art

In computer systems, in general, and in graphics processing units (GPUs), in particular, a pipeline consists of data processing elements performing different tasks connected in series. There is often local memory storage within the pipeline as well as access to cache elements in external memory. The normal flow of data can temporarily stop due to a number of possible causes, such as, but not limited to, availability of data, the need to perform more extensive local processing before proceeding, the need to access data from external memory, or momentary limitations in the ability to process incoming or outgoing data. When such a stall occurs, data processing circuits become idle, and the power usage consequently decreases significantly. Conversely, when the stall condition clears and traffic resumes, the backlog of data causes a transient surge in power consumption as all, or many, circuits become active simultaneously to process the resultant rush of data.

This surge in power consumption causes a transient increase in current, referred to as di/dt, or change in current with respect to time. Due to the di/dt event, excessive current is drawn from the power supply, which causes a local droop or sag in the voltage level at the circuit elements involved. After the initial rush has been processed, the rate of data traffic returns to typical levels, di/dt subsides, and voltage supply level returns to an average or typical value. A worst case analysis for a unit or microcircuit must include margin for the transient dip in voltage at all the cells potentially involved in, or nearby, a stall event.

One drawback to the above approach is that the worst case analysis results in a minimum voltage seen by the circuit elements over time and temperature variations, and this minimum supply voltage is a driving parameter in determining the maximum frequency of operation of the pipeline. As a lesser supply voltage level results in a reduced maximum clock frequency, di/dt events reduce the maximum operating frequency which, in turn, reduces processing speed, a critical performance specification of computer systems and GPUs. In addition, the reduced clock frequency due to di/dt events in one pipeline propagates across the entire system, in that the reduced clock frequency applies globally.

Accordingly, what is needed in the art is an approach or technique for reducing the occurrence, or limiting the severity, of di/dt events within a processing pipeline.

SUMMARY OF THE INVENTION

One embodiment of the present invention sets forth a computer-implemented method for reducing voltage noise in a data pipeline, including determining that a rate of data throughput from a first processing element to a second processing element within the data pipeline has been decreased below a nominal level due to a stall event, determining that the stall event has been cleared, and increasing the rate of data throughput to the nominal level over a time interval to control the amount of power consumed by the first processing element.

One advantage of the disclosed approach is that the strategic placement of di/dt throttle elements within a processing pipeline reduces the occurrence and severity of current induced supply voltage reductions, allowing increased operating frequency and faster processing to be realized.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
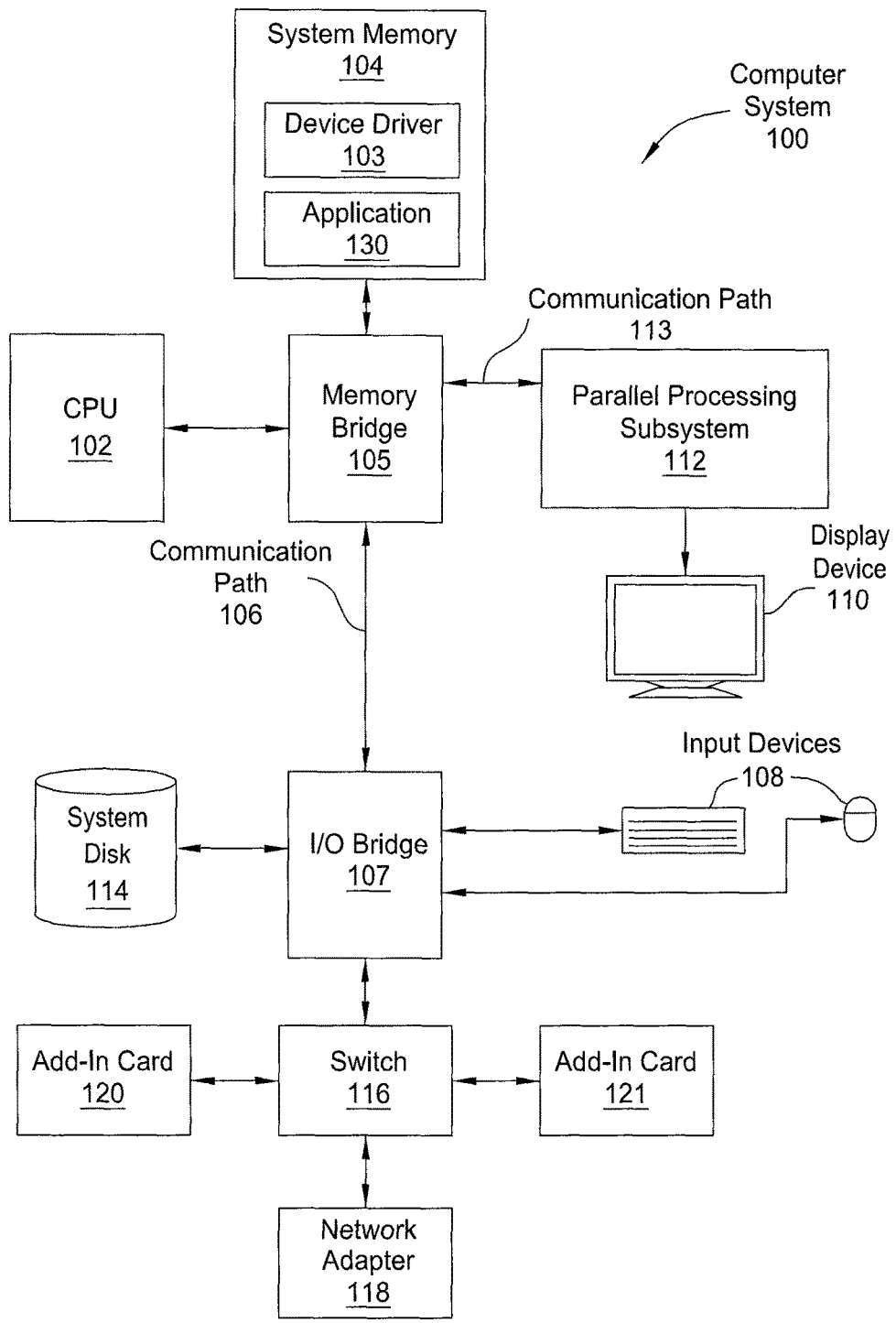
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
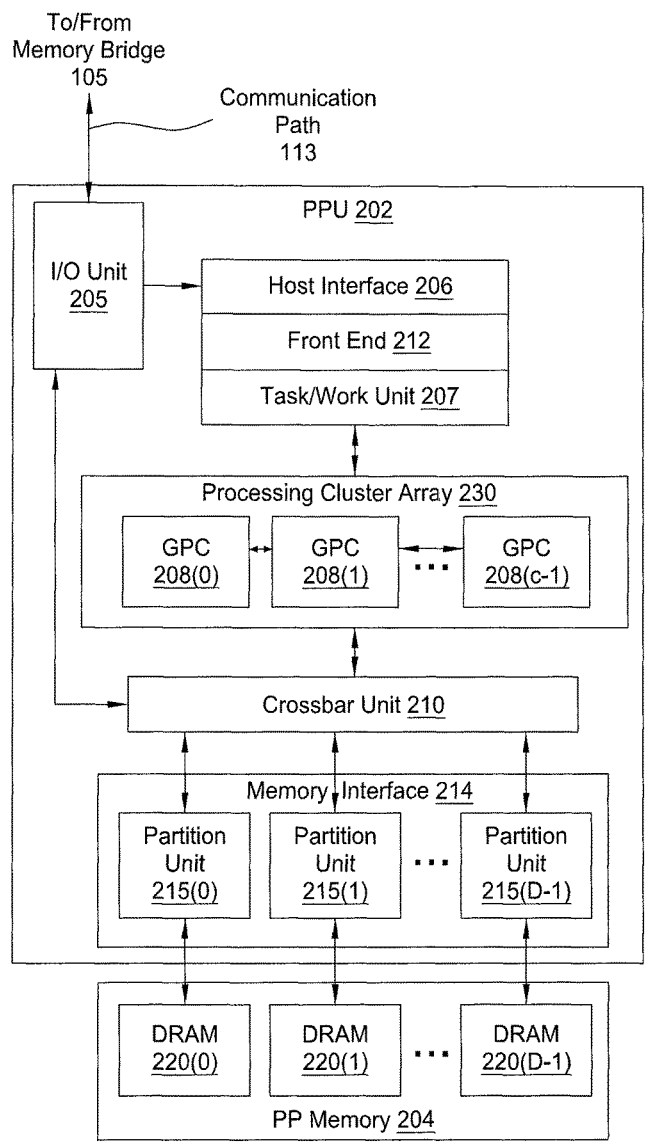
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
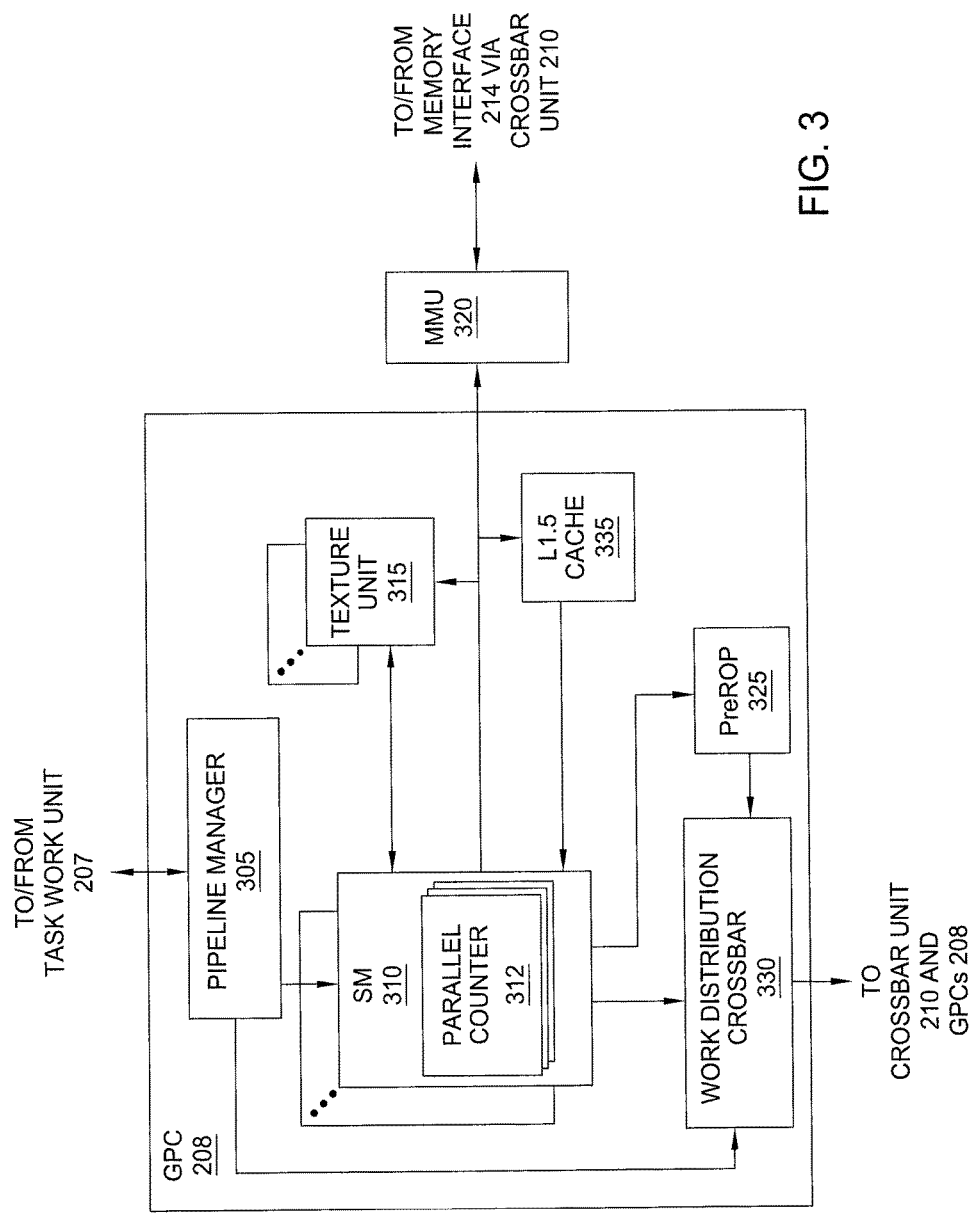
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Approach to Reducing Voltage Noise in a Stalled Data Pipeline

Figure 4:
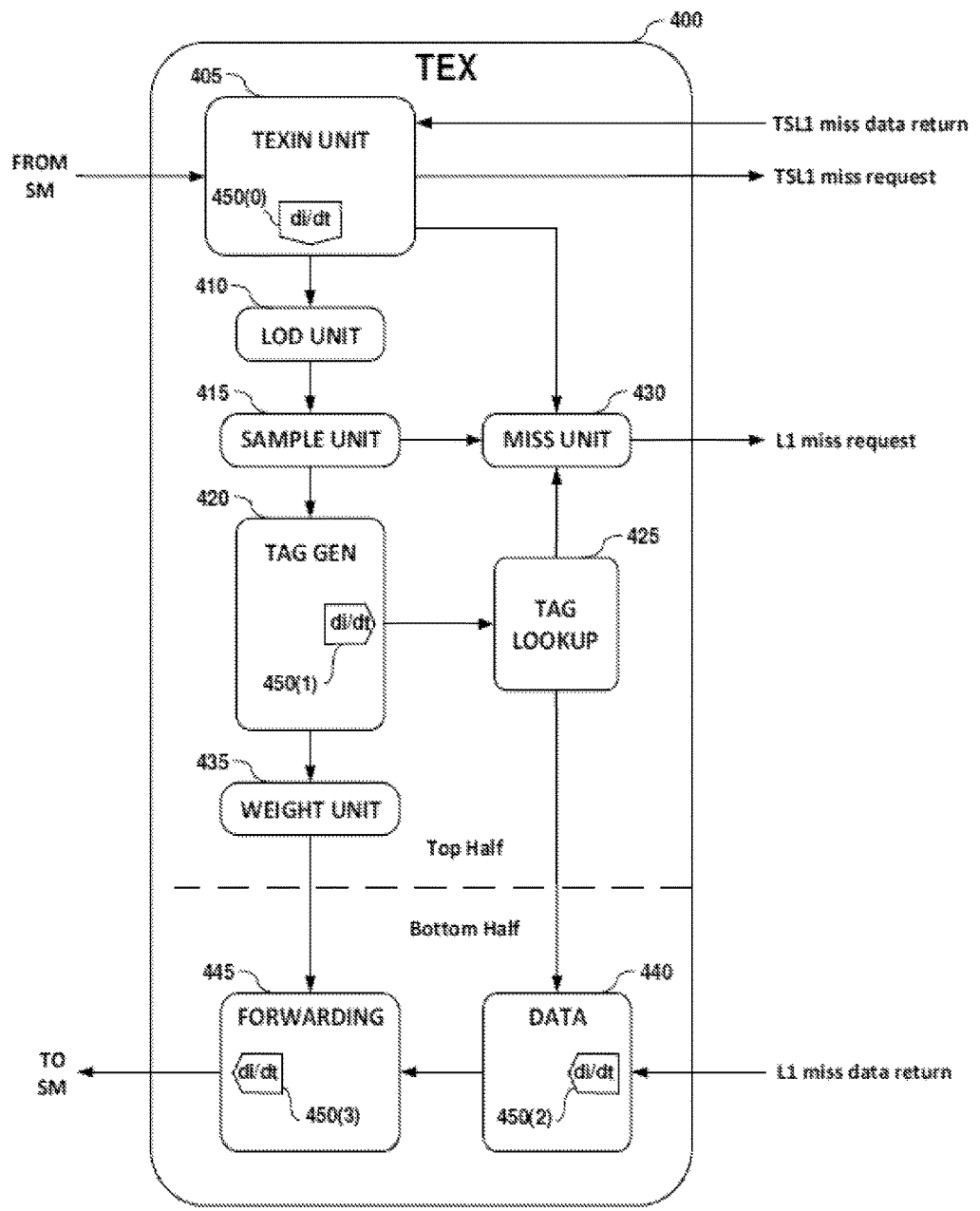
FIG. 4 is a conceptual diagram of a texture processing pipeline within a GPU, according to one embodiment of the present invention.

FIG. 4 is a conceptual diagram of a texture processing pipeline 400 that texture unit 315, within general processing cluster 208 of FIG. 3, can be configured to implement, according to one embodiment of the present invention. As shown, the top half of the texture processing pipeline 400 includes a texture input (TEXIN) unit 405 that includes di/dt throttle 450(0), a level of detail (LOD) unit 410, a sample unit 415, a TAG GEN unit 420 that includes di/dt throttle 450(1), a tag lookup unit 425, a miss processing unit 430, and a weight unit 435. The bottom half of the texture pipeline includes a data unit 440 that includes di/dt throttle 450(2), and a forwarding unit 445 that includes di/dt throttle 450(3).

TEXIN unit 405 receives texture header and sampler state data from SM (streaming multiprocessor) 310 and manages L1 caching of this state data. In some instances, if data is incomplete, in that there are missed texture states, TEXIN unit 405 sends a miss request to a level-2 state cache and receives back the missed state data. The time required for this request and response cycle creates a stall in the data flow from TEXIN unit 405 to LOD unit 410, during which data backs up in L1 cache. When the reception of the missing data is complete, the backed up data must be forwarded to LOD unit 410. There is normally no more than a single clock cycle delay in forwarding the backed up data, which is insufficient to prevent an excessive current transient due to the resulting rush of stored data. Control logic within TEXIN unit 405 enables di/dt throttle 450(0) which ramps up the rate of data transfer, typically by inserting additional delays in the processing activity. Such an approach allows a gradual transition from the stalled condition to an average or typical level, thus preventing excessive current flow and the consequent voltage droop. Persons skilled in the art will understand that various techniques exist to realize the di/dt throttle functionality.

LOD unit 410 computes mipmap level of detail and anisotropy parameters. Sample unit 415 generates texture coordinates for all samples blended for each pixel. TAG GEN 420 then performs edge wrapping/clamping of coordinates and L1 cache tag generation. TAG GEN 420 processes texture pixel (texel) data addresses in parallel. Tag lookup unit 425 processes tag lookups for the 1data cache and coalesces the tags to a minimal set. At times it is not possible to process all tags in parallel, and tag lookup unit 425 performs operations serially as required. While serial processing is occurring, data flow from TAG GEN 420 to tag lookup unit 425 stalls, as the lookups must be processed one at a time. When serial processing is complete, tag lookup unit 425 can accept the backed up data from TAG GEN 420. To avoid the consequent rush of traffic, control logic within TAG GEN 420 enables di/dt throttle 450(1) which gradually ramps up the rate of data transfer from the stalled condition to an average or typical level, thus preventing excessive current flow and the consequent voltage droop.

In one embodiment, weight unit 435 multiplies the LOD weight and anisotropic weight to give a final bilinear interpolation (bilerp) weight. These final bilerps and the minimal tag sets from tag lookup unit 425 are transferred to the bottom half of the pipeline. Techniques other than bilinear interpolation can also be accommodated. Data unit 440 includes L1 data cache and compression and decompression format conversion and formatting logic. However, when an L1 data cache miss occurs, miss unit 430 generates a request to the memory subsystem. The miss data is returned from the memory subsystem to the data unit 440. The request and return cycle for miss data creates a stall in the data flow, as the tag data backs up. To avoid the consequent rush of traffic when the miss data return is complete, control logic within data unit 440 enables di/dt throttle 450(2) which gradually ramps up the rate of data transfer from the stalled condition to an average or typical level, thus preventing excessive current flow and the consequent voltage droop.

Forwarding unit 445 performs arithmetic to blend texels within a bilerp and accumulates multiple bilerps. On occasions when SM is unable to accept data, the entire pipeline backs up. When SM then allows data flow, control logic within forwarding unit 445 enables di/dt throttle 450(3) which gradually ramps up the rate of data transfer from the stalled condition to an average or typical level, thus preventing excessive current flow and the consequent voltage droop.

Figure 5:
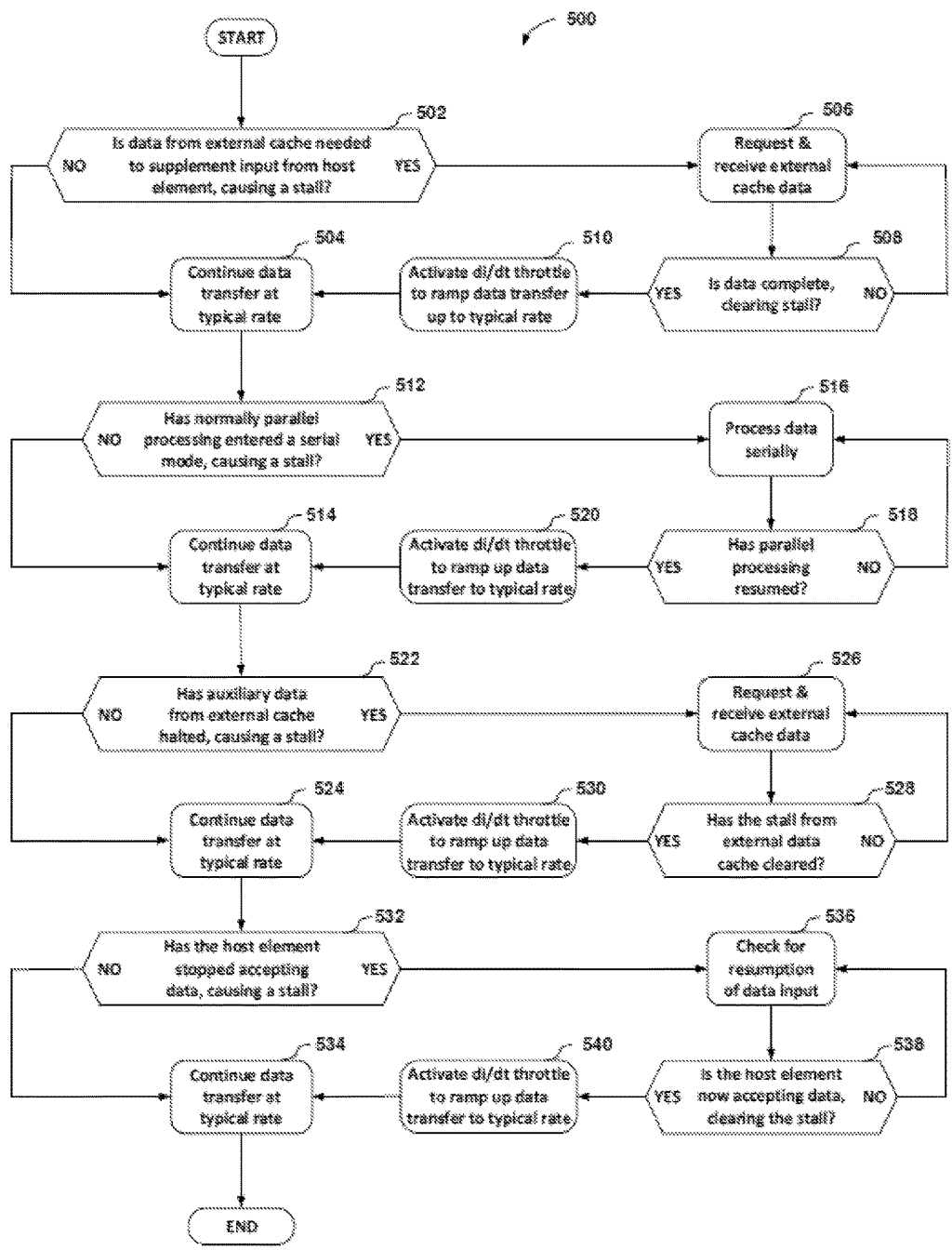
FIG. 5 is a flow diagram of method steps for decreasing voltage noise in a stalled pipeline, according to one embodiment of the present invention.

FIG. 5 is a flow diagram of method steps for reducing voltage noise in a stalled data pipeline, according to one embodiment of the present invention. Although the method steps are described in conjunction with the systems of FIG. 1 through FIG. 4, persons skilled in the art will understand that any system configured to perform the method steps, in any order, is within the scope of the present invention.

As shown, a method 500 begins at step 502 where control logic within TEXIN 405 determines if received data is missing elements required to successfully continue processing. If received data is sufficient, processing continues at a normal or typical rate in step 504. If additional data is required, control logic initiates a request and receives required data from external cache in step 506. During this interval, the forward flow of data is stalled. In step 508, control logic determines that additional data is complete and forward flow of data may be resumed. In step 510, control logic activates the di/dt throttle to gradually ramp up the rate of data transfer to a normal or typical rate.

In step 512, control logic within TAG GEN 420 determines if processing elements that normally operate in parallel are performing operations serially. If processing operations remain in parallel mode, data flow continues at a normal or typical rate in step 514. Serial processing, when required, occurs in step 516. During this interval, the forward flow of data is stalled. In step 518, control logic determines if serial processing persists. When parallel processing resumes, control logic activates the di/dt throttle in step 520 to gradually ramp up the rate of data transfer to a normal or typical rate.

In step 522, control logic within data unit 440 determines if auxiliary data from external memory is needed to continue processing. If external data is not needed, data flow continues at a normal or typical rate in step 524. Data input from external memory, when required, occurs in step 526. During this interval, the forward flow of data is stalled. In step 528, control logic determines if reception of external data input is complete. When transfer of external data is complete, control logic activates the di/dt throttle in step 530 to gradually ramp up the rate of data transfer to a normal or typical rate.

In step 532, control logic within forwarding unit 445 determines if SM 310 is able to receive normal data flow. If SM 310 is able to process the forwarded data properly, data flow continues at a normal or typical rate in step 534. When SM 310 declines data transfer, a stall condition occurs and the entire pipeline backs up in step 536. In step 538, control logic determines if data traffic to SM 310 is possible and, if so, activates the di/dt throttle in step 540 to gradually ramp up the rate of data transfer to a normal or typical rate.

In sum, computer and graphics processing elements, connected generally in series, form a pipeline. Circuit elements known as di/dt throttles are inserted within the pipeline at strategic locations where the potential exists for data flow to transition from an idle state to a maximum data processing rate. The di/dt throttles gently ramp the rate of data flow from idle to a typical level. Disproportionate current draw and the consequent voltage droop are thus avoided, allowing an increased frequency of operation to be realized.

One advantage of the approach disclosed herein is that transient supply voltage droop can be minimized, thereby allowing an increase in the operating clock frequency and faster pipeline processing. In addition, the higher minimum voltage affords more efficient power usage. Finally, the increased clock frequency benefits the system globally, in that processing of all other system elements using this clock occurs at the increased rate.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for reducing voltage noise in a data pipeline, the method comprising:
    determining that a rate of data throughput from a first processing element to a second processing element within the data pipeline has been decreased below a nominal level due to a stall event;

determining that the stall event has been cleared; and in response to determining that the stall event has been cleared, adding a set of delays to a processing activity performed by the first processing element to control an increase in the rate of data throughput to the nominal level in order to control the amount of power consumed by the first processing element.

2. The computer-implemented method of claim 1, further comprising:

determining that the stall event was triggered because a portion of input data is missing; and in response, decreasing the rate of data throughput below the nominal level.

3. The computer-implemented method of claim 2, further comprising accessing external memory to acquire the portion of the input data that is missing to clear the stall event.

4. The computer-implemented method of claim 1, further comprising:

determining that the stall event was triggered because the second processing element decreased a rate of data consumption in order to shift from a parallel processing mode to a serial processing mode; and in response, decreasing the rate of data throughput below the nominal level.

5. The computer-implemented method of claim 4, further comprising shifting from the serial processing mode to the parallel processing mode to clear the stall event.

6. The computer-implemented method of claim 1, further comprising:

determining that the stall event was triggered because a cache miss occurred; and in response, decreasing the rate of data throughput below the nominal level.

7. The computer-implemented method of claim 6, further comprising accessing external memory to acquire data associated with the cache miss to clear the stall event.

8. The computer-implemented method of claim 1, further comprising:

determining that the stall event was triggered because the second processing element is unable to accept data; and in response, decreasing the rate of data throughput below the nominal level.

9. The computer-implemented method of claim 8, further comprising acquiring sufficient processing resources to process additional data to clear the stall event.

10. The computer-implemented method of claim 1, wherein adding the set of delays is performed by a di/dt throttle element that controls a change in current with respect to time of the first processing element in response to determining that the stall event has been cleared.

11. A subsystem configured to reduce voltage noise in a data pipeline, including:

a first processing element;

a second processing element; and control logic configured to:

determine that a rate of data throughput from the first processing element to the second processing element has been decreased below a nominal level due to a stall event, determine that the stall event has been cleared, and in response to determining that the stall event has been cleared, add a set of delays to a processing activity performed by the first processing element to control an increase in the rate of data throughput to the nominal level in order to control the amount of power consumed by the first processing element.

12. The subsystem of claim 11, wherein the first processing element is configured to:

determine that the stall event was triggered because a portion of input data is missing; and in response, decrease the rate of data throughput below the nominal level.

13. The subsystem of claim 12, wherein the first processing element is further configured to access external memory to acquire the portion of the input data that is missing to clear the stall event.

14. The subsystem of claim 11, wherein the first processing element is configured to:

determine that the stall event was triggered because the second processing element decreased a rate of data consumption in order to shift from a parallel processing mode to a serial processing mode; and in response, decrease the rate of data throughput below the nominal level.

15. The subsystem of claim 14, wherein the second processing element is configured to shift from the serial processing mode to the parallel processing mode to clear the stall event.

16. The subsystem of claim 11, wherein the first processing element is configured to:

determine that the stall event was triggered because a cache miss occurred; and in response, decrease the rate of data throughput below the nominal level.

17. The subsystem of claim 16, wherein the first processing element is further configured to access external memory to acquire data associated with the cache miss to clear the stall event.

18. The subsystem of claim 11, wherein the first processing element is further configured to:

determine that the stall event was triggered because the second processing element is unable to accept data; and in response, decrease the rate of data throughput below the nominal level.

19. The subsystem of claim 18, wherein the second processing element is configured to acquire sufficient processing resources to process additional data to clear the stall event.

20. A computing device configured to reduce voltage noise in a data pipeline, including:

a memory;

a subsystem coupled to the memory and including:

a first processing element;

a second processing element; and control logic configured to:

determine that a rate of data throughput from the first processing element to the second processing element has been decreased below a nominal level due to a stall event, determine that the stall event has been cleared, and in response to determining that the stall event has been cleared, add a set of delays to a processing activity performed by the first processing element to control an increase in the rate of data throughput to the nominal level in order to control the amount of power consumed by the first processing element.

21. The computing device of claim 20, wherein the first processing element is configured to:

determine that the stall event was triggered because a portion of input data is missing; and in response, decrease the rate of data throughput below the nominal level.

* * * * *